No. 744,780. PATENTED NOV. 24, 1903.
W. P. MICHEL.
STREET CAR.
APPLICATION FILED SEPT. 4, 1903.
NO MODEL.

Witnesses:
William Schulz
Frederick Unfricht

Inventor:
William P. Michel
by: Frank P. Priere Att'y.

No. 744,780. Patented November 24, 1903.

UNITED STATES PATENT OFFICE.

WILLIAM P. MICHEL, OF NEW YORK, N. Y.

STREET-CAR.

SPECIFICATION forming part of Letters Patent No. 744,780, dated November 24, 1903.

Application filed September 4, 1903. Serial No. 171,869. (No model.)

*To all whom it may concern:*

Be it known that I, WILLIAM P. MICHEL, a citizen of the United States, residing at New York city, (Manhattan,) county and State of New York, have invented certain new and useful Improvements in Street-Cars, of which the following is a specification.

This invention relates to a street-car which is so constructed that passengers on leaving the car are not liable to become injured by stepping off while facing backward.

Figure 1:
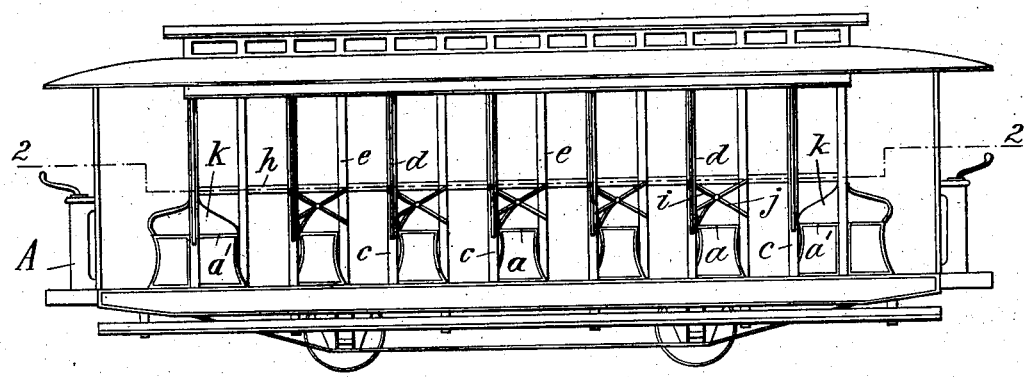
Figure 2:
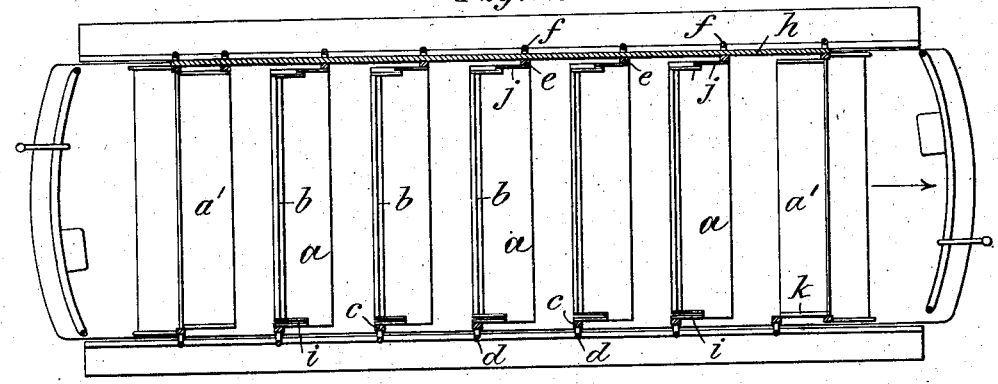
Figure 3:
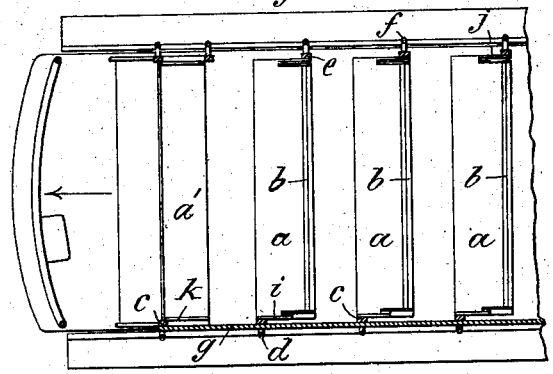
Figure 4:
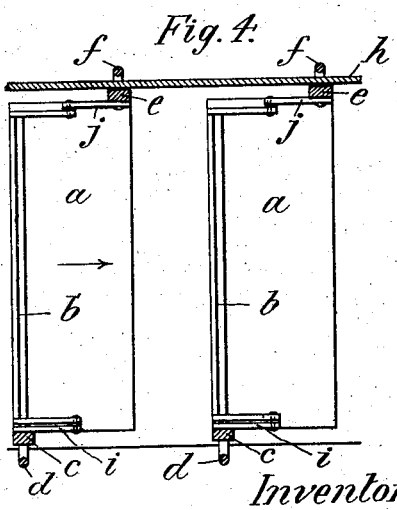

In the accompanying drawings, Figure 1 is a side elevation of my improved street-car; Fig. 2, a horizontal section on line 2 2, Fig. 1; Fig. 3, a similar section of part of the car, showing the seats reversed; and Fig. 4, a detail horizontal section through a pair of adjoining seats.

The letter A represents a street-car which is open at both sides and carries the usual transverse seats or benches $a$, having folding backs $b$, so that the passengers may face forward during the travel of the car in either direction. Along one side of the car extends a row of posts $c$, having upright handles $d$, and along the other side of the car extends the row of posts $e$, having the handles $f$. Each of the posts $c$ projects from a rear right corner of a seat $a$, while each of the posts $e$ projects from the diagonally opposite front left corner of such seat. Thus the posts $c$, together with their handles $d$, alternate with the posts $e$ and their handles $f$ when looking at the car sidewise. The post set at the right rear corner of each seat will be in front of the floor-space of the seat next behind and within easy reach of the passenger, and, further, the rear posts of one direction of travel will be the front posts in the opposite direction of travel. Thus when the car travels in the direction of the arrow Fig. 2 there will be placed along the right side of the car and in advance of the floor-space of each seat $a$ a handle $d$, which the passenger will readily grasp with his left hand in alighting. The handle $d$ at the rear corner of the seat from which the passenger rises is too far away to be within easy reach and is not liable to be grasped. The passenger will therefore leave the car grasping a forward handle with his left hand, and therefore properly facing forward. When the backs $b$ are reversed and the car travels in the direction of the arrow Fig. 3, a handle $f$ will be placed in front of the floor-space of each seat at the right side of the car and within convenient reach of the passenger's left hand, so that the passenger will again alight facing forward. The usual horizontal slidable guard-rails $g$ and $h$ on both sides of the car prevent when lowered the passenger from stepping off at the wrong side. They thereby also prevent the passenger from grasping the handle at the left side of the car, which would be in convenient reach of his left hand, and from stepping off backward.

As has been stated, the posts $c$ $e$ project from diagonally opposite corners of each seat $a$. Each back $b$ is connected to the rear post $c$ of its seat $a$ by a bracket or side rest $i$ and to the diagonally opposite front post $e$ by the bracket $j$, the brackets $i j$ extending in opposite directions. Both brackets $i j$ are pivoted to the back at the center of the latter, so that the back may be readily turned.

The two terminal seats $a'$ of the car have no reversible backs. To prevent the side rests $k$ of these seats $a'$ from being grasped while alighting, I prefer to make them solid or without hand-bars.

What I claim is—

1. A street-car having a row of handles on one side, and a second row of handles on the other side, the handles of one row alternating with those of the other row, substantially as specified.

2. A street-car having a series of transverse benches, reversible backs for said benches, and a row of handles on each side, the handles of one row alternating with those of the other row, substantially as specified.

3. A street-car having a transverse bench, a pair of posts projecting from diagonally opposite corners therefrom, and handles secured to the posts, substantially as specified.

4. A street-car having a transverse bench, a pair of posts projecting from diagonally opposite corners therefrom, brackets projecting from the posts in opposite directions, a back pivoted to the brackets, and handles secured to the posts, substantially as specified.

Signed by me at New York city, (Manhattan,) New York, this 3d day of September, 1903.

WILLIAM P. MICHEL.

Witnesses:
WILLIAM SCHULZ,
FRANK V. BRIESEN.